(12) United States Patent
Kressin

(10) Patent No.: US 6,535,238 B1
(45) Date of Patent: Mar. 18, 2003

(54) METHOD AND APPARATUS FOR AUTOMATICALLY SCALING PROCESSOR RESOURCE USAGE DURING VIDEO CONFERENCING

(75) Inventor: Mark Scott Kressin, Lakeway, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/004,248

(22) Filed: Oct. 23, 2001

(51) Int. Cl.[7] .................................................. H04N 7/14

(52) U.S. Cl. ................................ 348/14.01; 348/14.12; 348/14.11

(58) Field of Search ........................... 348/14.01–14.08, 348/14.09, 14.1, 14.11, 14.12, 14.13, 14.14; 709/204, 247; 370/260, 465, 468

(56) References Cited

FOREIGN PATENT DOCUMENTS

JP          02000350173 A  * 12/2000  ............ H04N/7/14

* cited by examiner

Primary Examiner—Melur Ramakrishnaiah
(74) Attorney, Agent, or Firm—Kudirka & Jobse, LLP

(57) ABSTRACT

An apparatus and technique are disclosed for controlling the resource usage of a processor during a video conference by dynamically varying the rate at which video images are compressed so as to maintain a target threshold of processor resource usage. A control program module interfaces with the video encoder of a video conferencing system and first checks that the current processor resource utilization is below a specified target threshold prior to compressing a video image from a stream of captured video data. If the processor resource utilization is below the target threshold, the video image is compressed. Otherwise, the image is skipped to conserve processor resources. The technique allows video conferencing products to dynamically adjust the rate of video frame compression based on available processor resources so as to maximize the user's video conferencing experiencing while minimizing the negative impact on other applications executing on the system.

37 Claims, 6 Drawing Sheets

METHOD AND APPARATUS FOR AUTOMATICALLY SCALING PROCESSOR RESOURCE USAGE DURING VIDEO CONFERENCING

FIELD OF THE INVENTION

This invention relates, generally, to data processing systems and, more specifically, to a technique for scaling processor usage in a video conference system.

BACKGROUND OF THE INVENTION

This application is copending and commonly assigned with the following U.S. patent applications all filed Oct. 24, 2000, the subject matters of which are incorporated herein by reference for all purposes, including the following:

U.S. patent application Ser. No. 09/695,193, entitled "Method and Apparatus for Providing Full Duplex and Multipoint IP Audio Streaming";

U.S. patent application Ser. No. 09/695,553, entitled "Method and Apparatus for Multi-mode IP Audio Streaming";

U.S. patent application Ser. No. 09/695,203, entitled "Method and Apparatus Two-way Distributed Audio Mixing of Multiway Calls".

Recently, systems for enabling audio and /or video conferencing of multiple parties over packet-switched networks, such as the Internet, have become commercially available. Such systems typically allow participants to simultaneously receive and transmit audio and/or video data streams depending on the sophistication of the system. Conferencing systems used over packet-switched networks have the advantage of not generating long-distance telephone fees and enable varying levels of audio, video, and data integration into the conference forum. In a typical system, a conference server receives audio and/or video streams from the participating client processes to the conference, mixes the streams and retransmits the mixed stream to the participating client processes. Except for cameras, displays and video capture cards most video conferencing systems are implemented in software.

Computer based video conferencing products that are implemented in software, are very CPU resource intensive applications. Traditionally these products have not been designed to accommodate a wide range of CPU processors and to operate in varying workloads conditions without negatively impacting the performance of other applications running on the system. The most CPU resource intensive part of video conferencing products is the act of compressing the video images for transmission on circuit-switched networks.

SUMMARY OF THE INVENTION

The present invention discloses a technique to control the CPU resource usage of a video conferencing product by dynamically varying the rate at which video images are compressed (video frame rate) in order to maintain a target level of CPU resource usage. The technique allows video conferencing products to dynamically slow or speed up the video frame rate based on the available CPU resource thus allowing them operate effectively on a wide range of system processors and under varying workload conditions, without negatively impacting other applications on the system, while, and at the same, time maximizing the user's video conferencing experience. A front end control program module interfaces with the video encoder of the video conferencing system and first checks that the current CPU resource utilization is below a specified target threshold prior to compressing a video image from the fixed rate stream captured by the camera. If the current CPU resource utilization is above the target threshold, the video image is skipped to conserve CPU resources. If the current CPU resource utilization is below the target threshold, an estimate is made of the amount of CPU resources needed to compress the video image given the current level of CPU utilization, and, if the estimate is within a tolerable range of the target threshold, the video image is compressed and transmitted. In this manner, video images will be compressed and sent as fast as possible while maintaining the specified target CPU resource usage.

As an example of the above technique, if the target CPU resource usage threshold is set to 80%, indicating the CPU should not devote more that 80% of its resource to a video conferencing related processing, a video conferencing product implementing the invention will produce a "fast as possible" video frame rate while still leaving 20% of free CPU resource for use by other applications on the system. On older slower processors, this technique will produce a slower video frame rate while leaving some free CPU resource for other applications. On newer faster processors, the video frame rate will be faster, but only up to the point where the specified CPU resource utilization target threshold is not exceeded. Similarly, as workload conditions for the CPU, the video frame rate will vary to accommodate the changing workload. As more applications are started on the processor, the video frame rate will slow down to maintain the CPU resource usage threshold. Then, as other applications terminate, the video frame rate will increase to utilize the recently freed CPU resource up to the specified target threshold.

According to a first aspect of the invention, in a computer system having a processor, a device for generating a stream of video data and a mechanism for compression of captured video data, a method for controlling processor utilization during a video conferencing session comprises: (A) comparing a current rate of processor utilization with a predefined threshold for processor utilization; and (B) preventing a captured portion of the video data from being processed by the compression mechanism, if compression of the captured portion of the video data would cause a future rate of processor utilization to exceed the predefined threshold for processor utilization. In one embodiment of the method limitation (B) further comprises: (B1) comparing a sum of the known rate of processor utilization and the current rate of processor utilization with the predefined threshold for processor utilization. In an alternative embodiment of the method limitation (B) comprises: (B1) comparing a difference of the known rate of processor utilization and the predefined threshold for processor utilization with the current rate of processor utilization.

According to a second aspect of the invention, in a computer system having a processor, a device for generating a stream of video data and a mechanism for compression of captured video data, a method for controlling processor utilization during a video conferencing session comprises: (A) determining a current rate of processor utilization; (B) comparing the current rate of processor utilization with a threshold for processor utilization; and (C) preventing a captured portion of the video data from being processed by the compression mechanism, if compression of the captured portion of the video data would cause a future rate of processor utilization to exceed the threshold for processor utilization.

According to a third aspect of the invention, in a computer system having a processor, a device for generating a stream of video data and a mechanism for compression of captured video data, a method for controlling processor utilization during a video conferencing session comprises: (a) receiving a request for a captured portion of the stream of video data; (b) determining a current rate of processor utilization; (c) comparing the current rate of processor utilization with the specified threshold for processor utilization; (d) preventing a portion of the stream of captured video data from being processed by the compression mechanism, if compression of the portion of the captured video data would cause the rate of processor utilization to exceed the specified threshold for processor utilization; and (e) repeating (b) through (d). In one embodiment of the method further comprises: (e) indicia identifying a specified threshold for processor utilization. In another embodiment of the method limitation (d) further comprises: (d1) providing a known rate of processor utilization for a known quantity of captured video data and (d2) comparing a sum of the known rate of processor utilization and the current rate of processor utilization with the threshold for processor utilization. In an alternative embodiment of the method limitation (d) further comprises: (d1) providing a known rate of processor utilization for a known quantity of captured video data and (d2) comparing a difference of the known rate of processor utilization and the threshold for processor utilization with the current rate of processor utilization.

According to a fourth aspect of the invention, a computer program product and data signal for use with a computer system having a processor, a device for generating a stream of video data and a mechanism for compression of captured video data, comprise: A) program code for receiving a request for a captured portion of the stream of video data; B) program code for determining a current rate of processor utilization; C) program code for comparing the current rate of processor utilization with the threshold for processor utilization; and D) program code for preventing a portion of the captured video data from being processed by the compression, if compression of the portion of the captured video data would cause the rate of processor utilization to exceed the threshold for processor utilization.

According to a fifth aspect of the invention, an apparatus for use with a computer system having a processor, a device for generating a stream of video data and a mechanism for compression of captured video data, comprises: (A) program logic configured to receive a request for a captured portion of the stream of video data; (B) program logic configured to determine a current rate of processor utilization; (C) program logic configured to compare the current rate of processor utilization with the threshold for processor utilization; and (D) program logic configured to prevent a portion of the captured video data from being processed by the compression mechanism, if compression of the portion of the captured video data would cause the rate of processor utilization to exceed the threshold for processor utilization.

BRIEF DESCRIPTION OF THE DRAWINGS

The above and further advantages of the invention may be better understood by referring to the following description in conjunction with the accompanying drawings in which.

DETAILED DESCRIPTION

Figure 1:
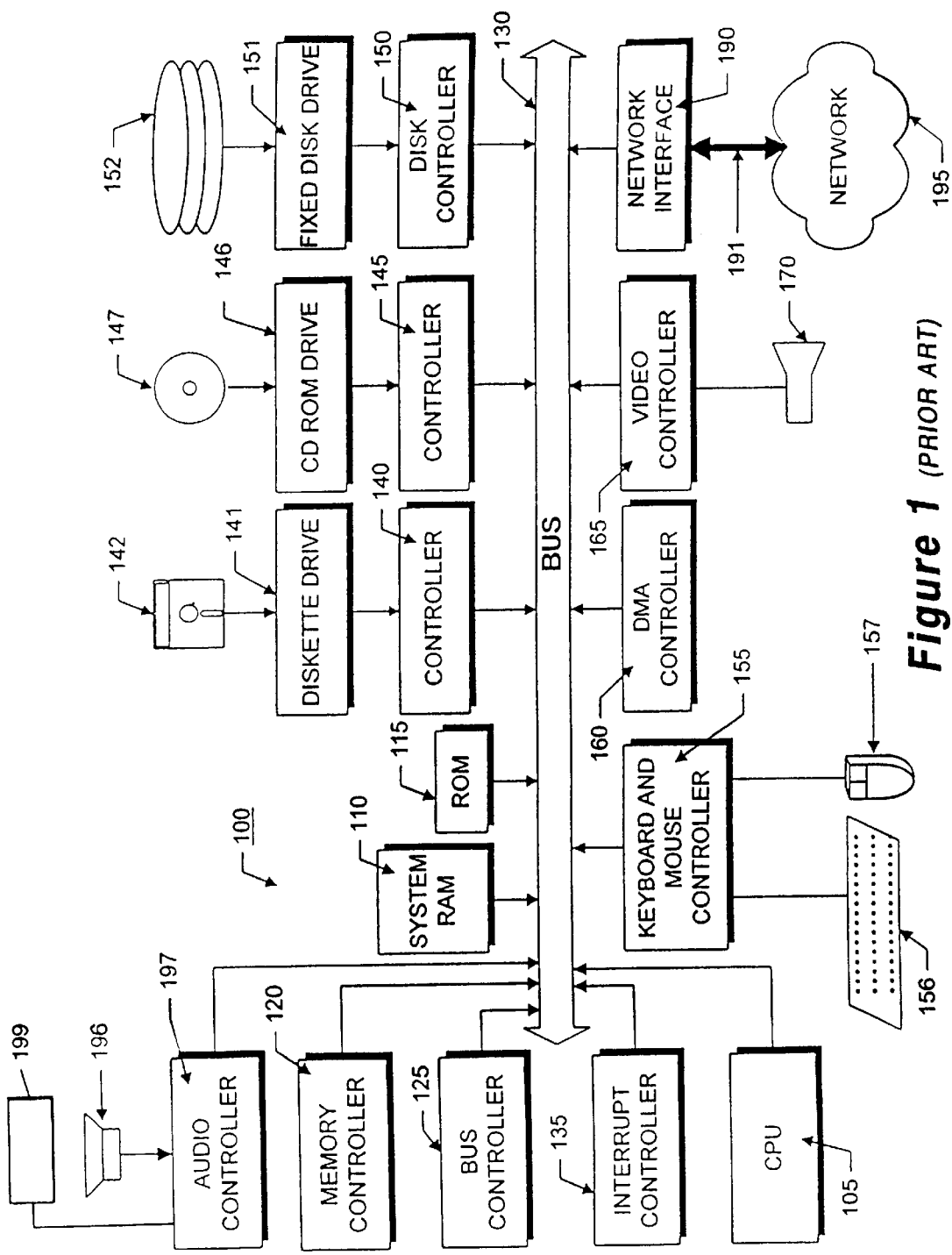
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio/video controller 197, as illustrated. A camera or other video capture device 199 is connected to bus 130 by audio/video controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. In the illustrative embodiment, the user interface of a computer system may comprise a video display and any accompanying graphic use interface presented thereon by an application or the operating system, in addition to or in combination with any keyboard, pointing device, joystick, voice recognition system, speakers, microphone or any other mechanism through which the user may interact with the computer system.

Computer system 100 also includes a communications adapter 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y., or Windows® operating system, available from Microsoft Corporation, Redmond Wash. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including AIX, UNIX and LINUX, DOS, etc. One or more applications 220 such as Lotus Notes or Lotus Sametime, both commercially available from Lotus Development Corp., Cambridge, Mass. may execute under control of the operating system. If operating system 210 is a true multi-tasking operating system, multiple applications may execute simultaneously.

In the illustrative embodiment, the present invention may be implemented using object-oriented technology and an operating system which supports execution of object-oriented programs. For example, the inventive control program module may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

In the illustrative embodiment, the elements of the system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

Video Compression Standards

When sound and video images are captured by computer peripherals and are encoded and transferred into computer memory, the size (in number of bytes) for one seconds worth of audio or a single video image can be quite large. Considering that a conference is much longer than 1 second and that video is really made up of multiple images per second, the amount of multimedia data that needs to be transmitted between conference participants is quite staggering. To reduce the amount of data that needs to flow between participants over existing non-dedicated network connections, the multimedia data can be compressed before it is transmitted and then decompressed by the receiver before it is rendered for the user. To promote interoperability, several standards have been developed for encoding and compressing multimedia data.

H.263 is a video compression standard which is optimized for low bitrates (<64 k bits per second) and relatively low motion (someone talking). Although the H.263 standard supports several sizes of video images, the illustrative embodiment uses the size known as QCIF. This size is defined as 176 by 144 pixels per image. A QCIF-sized video image before it is processed by the H.263 compression standard is 38016 bytes in size. One seconds worth of full motion video, at thirty images per second, is 1,140,480 bytes of data. In order to compress this huge amount of data into a size of about 64 k bits, the compression algorithm utilizes the steps of: i) Differential Imaging; ii) Motion estimation/compensation; iii) Discrete Cosine Transform (DCT) Encoding; iv) Quantization and v) Entropy encoding. The first step in reducing the amount of data that is needed to represent a video image is Differential Imaging, that is, to subtract the previously transmitted image from the current image so that only the difference between the images is encoded. This means that areas of the image that do not change, for example the background, are not encoded. This type of image is referred to as a "D" frame. Because each "D" frame depends on the previous frame, it is common practice to periodically encode complete images so that the decoder can recover from "D" frames that may have been lost in transmission or to provide a complete starting point when video is first transmitted. These much larger complete images are called "I" frames.

The next step in reducing the amount of data that is needed to represent a video image is Motion estimation/compensation. The amount of data that is needed to represent a video image is further reduced by attempting to locate where areas of the previous image have moved to in the current image. This process is called motion estimation/compensation and reduces the amount of data that is encoded for the current image by moving blocks (16×16 pixels) from the previously encoded image into the correct position in the current image.

The next step in reducing the amount of data that is needed to represent a video image is Discrete Cosine Transform (DCT) Encoding. Each block of the image that must be encoded because it was not eliminated by either the differential images or the motions estimation/compensation steps is encoded using Discrete Cosine Transforms (DCT). These DCT are very good at compressing the data in the block into a small number of coefficients. This means that only a few DCT coefficients are required to recreate a recognizable copy of the block.

The next step in reducing the amount of data that is needed to represent a video image is Quantization. For a typical block of pixels, most of the coefficients produced by DCT encoding are close to zero. The quantizer step reduces the precision of each coefficient so that the coefficients near zero are set to zero leaving only a few significant non-zero coefficients.

The next step in reducing the amount of data that is needed to represent a video image is Entropy encoding. The last step is to use an entropy encoder (such as a Huffman encoder) to replace frequently occurring values with short binary codes and replaces infrequently occurring values with longer binary codes. This entropy encoding scheme is used to compress the remaining DCT coefficients into the actual data that that represents the current image. Further details regarding the H.263 compression standard can be obtained from the ITU-T H.263 available from the International Telecommunications Union, Geneva, Switzerland.

Sametime Environment

The illustrative embodiment of the present invention is described in the context of the Sametime family of real-time collaboration software products, commercially available from Lotus Development Corporation, Cambridge, Mass. The Sametime family of products provide awareness, conversation, and data sharing capabilities, the three foundations of real-time collaboration. Awareness is the ability of a client process, e.g. a member of a team, to know when other client processes, e.g. other team members, are online. Conversations are networked between client processes and may occur using multiple formats including instant text messaging, audio and video involving multiple client processes. Data sharing is the ability of client processes to share documents or applications, typically in the form of objects. The Sametime environment is an architecture that consists of Java based clients that interact with a Sametime server. The Sametime clients are built to interface with the Sametime Client Application Programming Interface, published by Lotus Development Corporation, which provides the services necessary to support these clients and any user developed clients with the ability to setup conferences, capture, transmit and render audio and video in addition to interfacing with the other technologies of Sametime.

The present invention may be implemented as an all software module in the Multimedia Service extensions to the existing family of Sametime 1.0 or 1.5 products. Such Multimedia Service extensions are included in the Sametime Server 300, the Sametime Connect client 310 and Sametime Meeting Room Client (MRC) 312.

Figure 2:
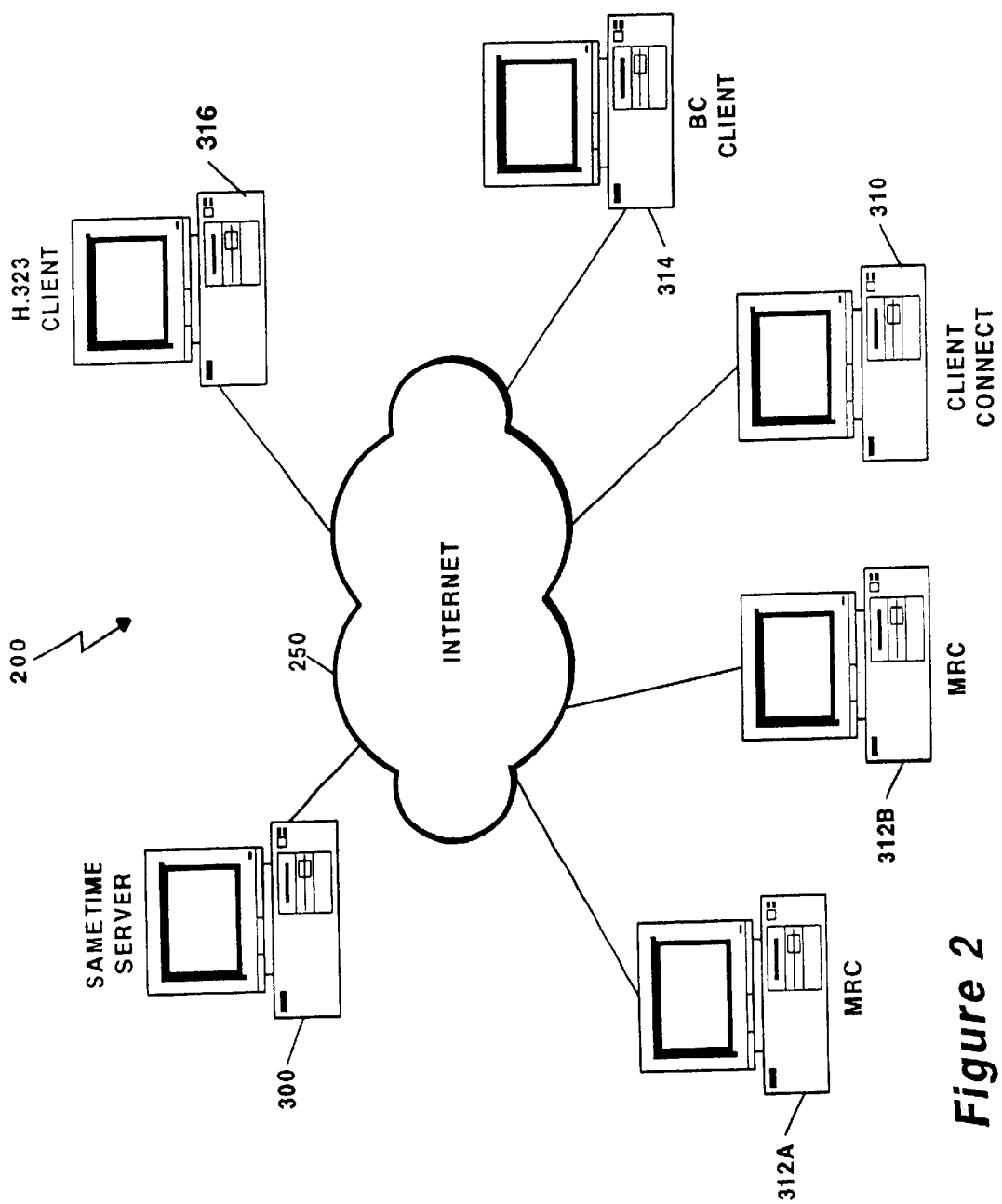
FIG. 2 is a illustrates conceptually the relationship between the components of the system in which the present invention may be utilized.

FIG. 2 illustrates a network environment in which the invention may be practiced, such environment being for exemplary purposes only and not to be considered limiting. Specifically, a packet-switched data network 200 comprises a Sametime server 300, a plurality of Meeting Program Client (MRC) client processes 312A–B, a Broadcast Client (BC) client 314, an H.323 client process 316, a Sametime Connect client 310 and an Internet network topology 250, illustrated conceptually as a cloud. One or more of the elements coupled to network topology 250 may be connected directly or through Internet service providers, such as America On Line, Microsoft Network, Compuserve, etc.

The Sametime MRC 312, may be implemented as a thin mostly Java client that provides users with the ability to source/render real-time audio/video, share applications/whiteboards and send/receive instant messages in person to person conferences or multi-person conferences. The Sametime BC 314 is used as a "receive only" client for receiving audio/video and shared application/whiteboard data that is sourced from to the MRC client 312. Unlike the MRC client, the BC client does not source audio/video or share applications. Both the MRC and BC clients run under a web browser and are downloaded and cached as need when the user enters a scheduled Sametime audio/video enabled meeting, as explained hereinafter in greater detail.

The client processes 310, 312, 314, and 316 may likewise be implemented as part of an all software application that run on a computer system similar to that described with reference to FIG. 1, or other architecture whether implemented as a personal computer or other data processing system. In the computer system on which a Sametime client process is executing, a sound/video card, such as card 197 accompanying the computer system 100 of FIG. 1, may be an MCI compliant sound card while a communication controller, such as controller 190 of FIG. 1, may be implemented through either an analog digital or cable modem or a LAN-based TCP/IP network connector to enable Internet/Intranet connectivity.

Server 300 may be implemented as part of an all software application which executes on a computer architecture similar to that described with reference to FIG. 1. Server 300 may interface with Internet 250 over a dedicated connection, such as a T1, T2, or T3 connection. The Sametime server is responsible for providing interoperability between the Meeting Room Client and H.323 endpoints. Both Sametime and H.323 endpoints utilize the same media stream protocol and content differing in the way they handle the connection to server 300 and setup of the call. The Sametime Server 300 supports the T.120 conferencing protocol standard, published by the ITU, and is also compatible with third-party client H.323 compliant applications like Microsoft's NetMeeting and Intel's ProShare. The Sametime Server 300 and Sametime Clients work seamlessly with commercially available browsers, such as NetScape Navigator version 4.5 and above, commercially available from America On-line, Reston, Va.; Microsoft Internet Explorer version 4.01 service pack 2 and above, commercially available from Microsoft Corporation, Redmond, Wash. or with Lotus Notes, commercially available from Lotus Development Corporation, Cambridge, Mass.

Figure 3:
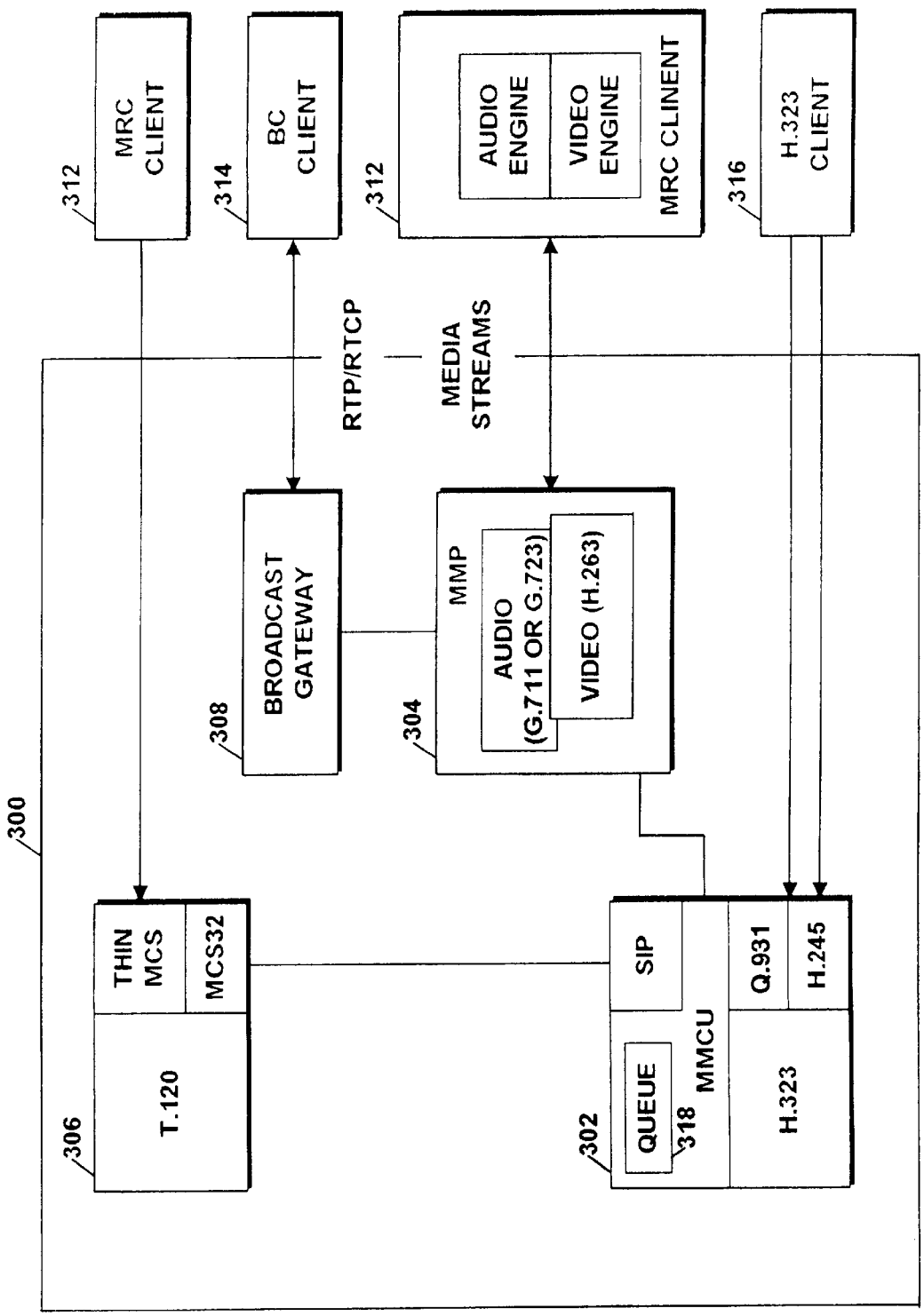
FIG. 3 is a block diagram conceptually illustrating the functional components of the multimedia conference server in accordance with the present invention.

FIG. 3 illustrates conceptually a block diagram of a Sametime server 300 and MRC Client 312, BC Client 314 and an H.323 client 316. As illustrated, both MRC Client 312 and MMP 304 include audio and video engines, including the respective audio and video codecs. The present invention effects the video stream forwarded from a client to MMP 304 of server 300.

In the illustrative embodiment, the MRC and BC component of Sametime environment may be implemented using object-oriented technology. Specifically, the MRC and BC may be written to contain program code which creates the objects, including appropriate attributes and methods, which are necessary to perform the processes described herein and interact with the Sametime server 300 in the manner described herein. Specifically, the Sametime clients includes a video engine which is capable of capturing video data, compressing the video data, transmitting the packetized audio data to the server 300, receiving packetized video data, decompressing the video data, and playback of the video data. Further, the Sametime MRC client includes an audio engine which is capable of detecting silence, capturing audio data, compressing the audio data, transmitting the packetized audio data to the server 300, receiving and decompressing one or more streams of packetized audio data, mixing multiple streams of audio data, and playback of the audio data. Sametime clients which are capable of receiving multiple audio streams also perform mixing of the data payload locally within the client audio engine using any number of known algorithms for mixing of multiple audio streams prior to playback thereof. The codecs used within the Sametime clients for audio and video may be any of those described herein or other available codecs.

The Sametime MRC communicates with the MMCU 302 for data, audio control, and video control, the client has a single connection to the Sametime Server 300. During the initial connection, the MMCU 302 informs the Sametime MRC client of the various attributes associated with a meeting. The MMCU 302 informs the client process which codecs to use for a meeting as well as any parameters necessary to control the codecs, for example the associated frame and bit rate for video and the threshold for processor usage, as explained in detail hereinafter. Additional information regarding the construction and functionality of server 300 and the Sametime clients 312 and 314 can be found in the previously-referenced co-pending applications.

It is within this framework that an illustrative embodiment of the present invention is being described, it being understood, however, that such environment is not meant to limit the scope of the invention or its applicability to other environments. Any system in which video data is captured and presented by a video encoder can utilize the inventive concepts described herein.

Monitoring Control Program

Figure 4:
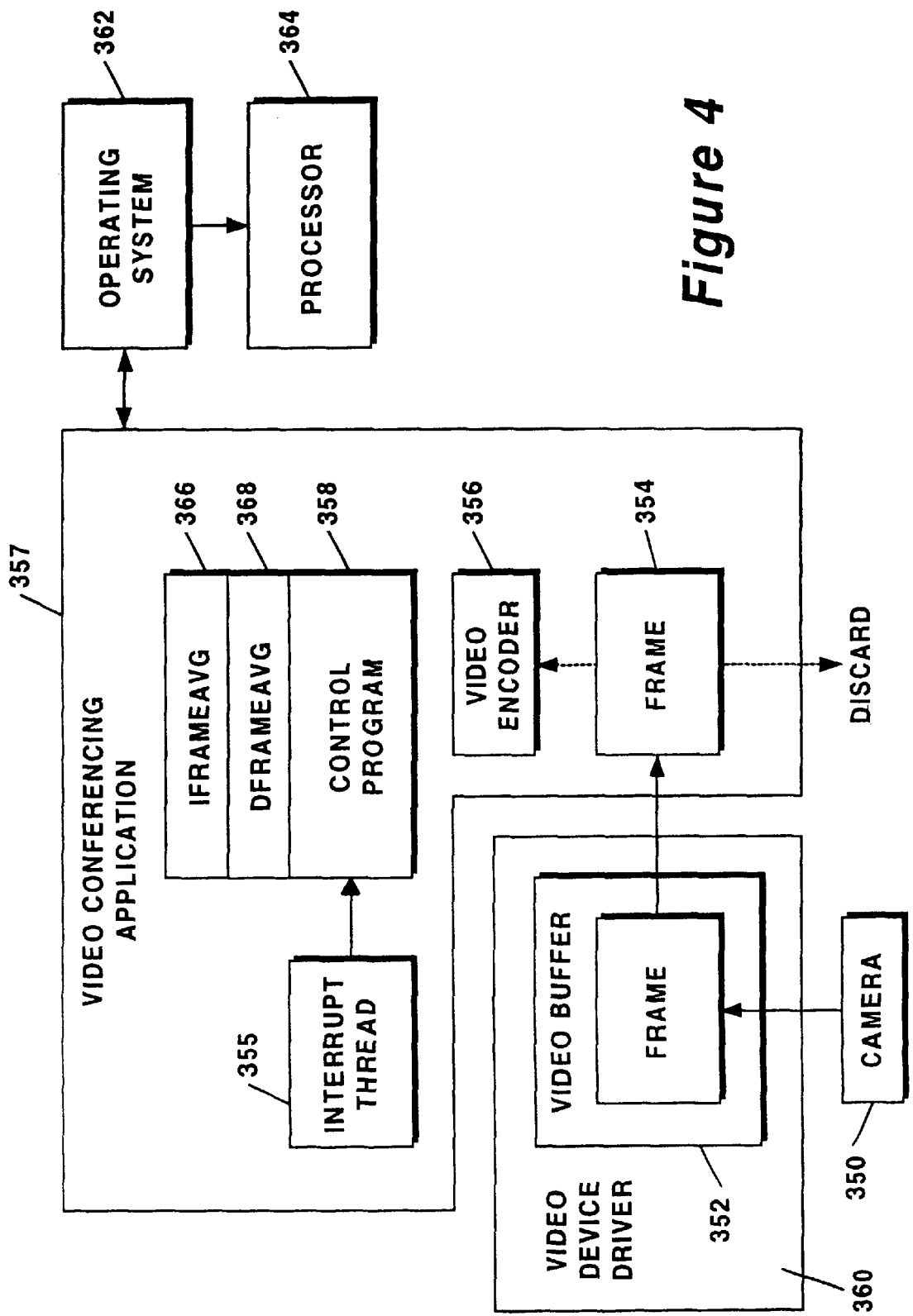
FIG. 4 is a illustrates conceptually a fixed rate stream of captured video data.

FIG. 4 illustrates conceptually a video data stream and its relation to the various components within the environment in which the invention may be practiced. Specifically, a camera 350 captures a continual stream of video data and stores the data in a video buffer in the camera driver 352. An interrupt generated by the video conferencing application requests a frame from the device driver's frame buffer. Prior to the client providing the frame of captured video data to video encoder 356, control program 358 selectively determines whether the frame of video data which is to be compressed as either an I-frame or D-frame per the interrupt request from the video conferencing application will exceed the designated usage threshold of processor 364 by interacting with operating system 362 in the manner described herein.

Typically, human beings perceive 30 frames per second as real motion video, however, this can drop as low as 10–15 per second to still be perceptible as video images. The H.263 codec is a bitrate managed codec, meaning the number of bits that are utilized to compress a video frame into initial frame (I-frame) is different than the number of bits that are used to compress each delta frame (D-frame). Compressing only the visual changes between the delta frame and the previously compressed frame makes a delta frame. As the encoder compresses frames into either the I-frame or D-frame, the encoder may skip video frames as needed to maintain the video bitrate below the set bitrate target. The invention contemplates the calculation of the average time used to compress both an I-frame and a D-frame. These values, referred to hereafter as the IFRAMEAVG and DFRAMEAVE, respectively, may be an integer value between 0 and 100 and represents the average number of processor cycles used to compress the captured video data in an I-frame and a D-frame, respectively. These values 366 and 368 may be stored in memory or special registers associated with video conferencing application 357.

Figure 5A:
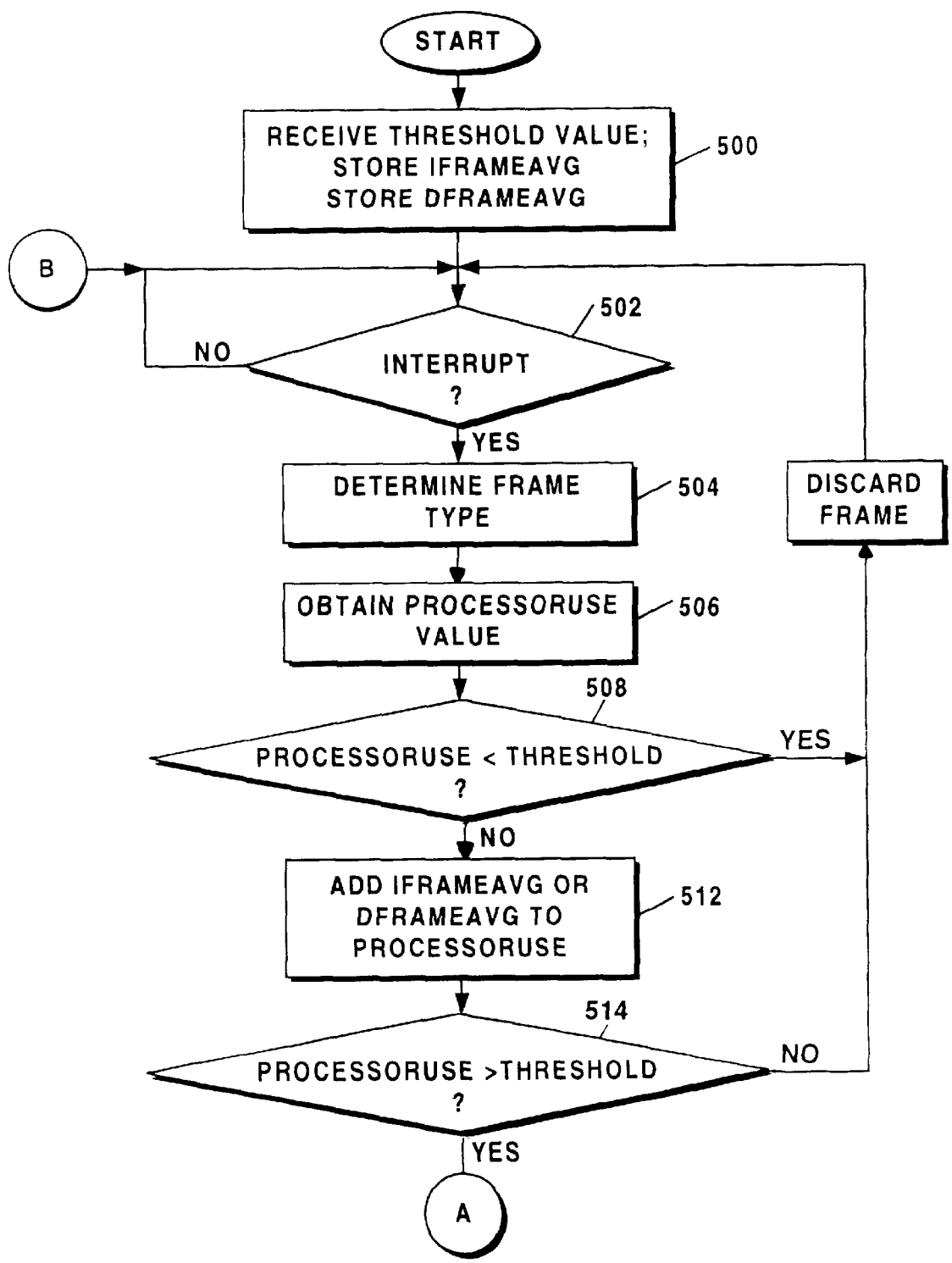
FIGS. 5A–B form a flow chart illustrating the process steps performed during the present invention.
Figure 5B:
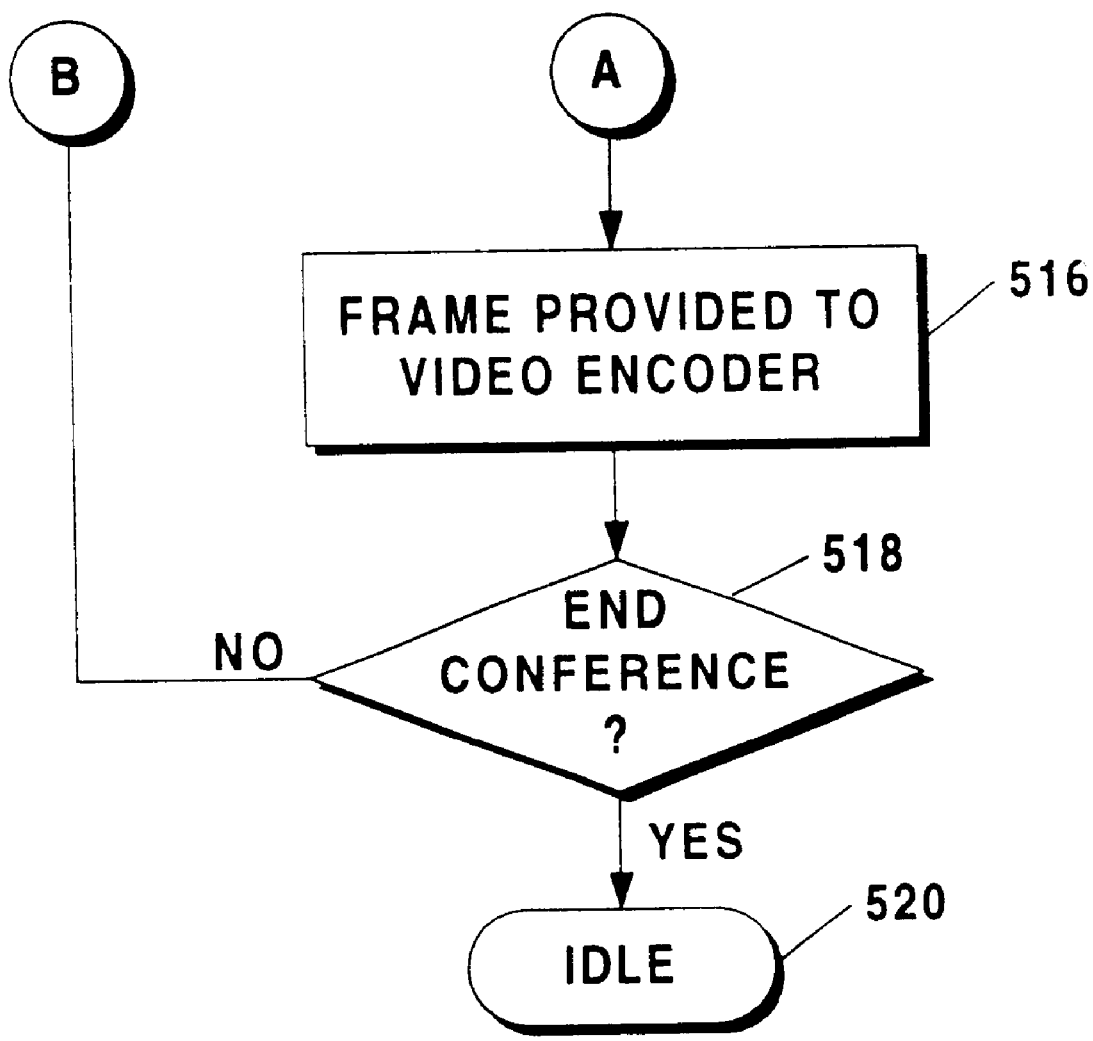

Referring to FIGS. 5A–B, a flow chart of the process steps performed by control program 358 during a video conferencing session is illustrated. In the illustrative embodiment, the system administrator for the video conference server to a Sametime meeting sets a threshold value for all Sametime clients in a video conference using a display box or pull down menu from the graphic user interface of the system administrator control program associated with the Sametime server 300. This threshold, referred to hereafter as the THRESHOLD value, may be an integer value between 0 and 100 and represents the amount of processor resources the system administrator is willing to have used by the video conference. In an alternative embodiment, the THRESHOLD value may be defined locally by the user of the client system.

According to the invention, control program 358 receives the THRESHOLD value from either a remote or local source and stores or initializes values for IFRAMEAVG and DFRAMEAVE, as illustrated by step 500. Next, control program 358 receives an interrupt from interrupt thread 355 of video conferencing application 357 indicating a request for either an I-frame or a D-frame of video data from the encoder 356, as illustrated by decisional step 502. Upon receipt of the interrupt, control program 358 requests a video frame from the device driver frame buffer 352. Before sending the video frame received from the device driver frame buffer 352 into the video encoder 356 to be compressed into either an I-frame or D-frame, the control program 358 determines the current level of processor resource utilization, as illustrated by step 506. This process may differ depending on the operating system on which the video conferencing application is executing. In operation systems such as Windows 95 or Windows 98, commercially available from Microsoft Corporation, Redmond, Wash., this data is continually available through the operating system registry using an appropriate system call and a key as a parameter. In operating system such as Windows NT and Windows 2000, this functionality must be turned on before being requested. In Windows NT, the appropriate call is REGQUERYVALUEEX and requires passing the registry key hkey_performance_data as a parameter with the call. This call will return an integer value between 0 and 100 which represents the amount of non-free processor time as measured in processor cycles and referred to hereafter as PROCESSORUSE.

Next, the PROCESSORUSE value is compared with the previously received THRESHOLD value, as illustrated by decisional step 508. If the PROCESSORUSE value is above the THRESHOLD value, the frame of video data is discarded and no new video data is supplied to the video encoder 356, as illustrated by step 510. If the PROCESSORUSE value is below or equal to the THRESHOLD value, the value of either IFRAMEAVG or DFRAMEAVE, depending on the type of frame specified in the interrupt, is added to the PROCESSORUSE value to create a new PROCESSORUSE value, as illustrated by decisional steps 512. If the new PROCESSORUSE value exceed the THRESHOLD value, as illustrated by decisional steps 514, the frame of video data is discarded and no new video data is supplied to the video encoder 356, similar to step 510. For purposes of the invention the new PROCESSORUSE value is considered to exceed the THRESHOLD value by a single processor cycle or, alternatively, by a certain amount, which can be anywhere from between 1 to a specified number of processor cycles, e.g. 10, depending on the level of exactness desired. Otherwise, if the new PROCESSORUSE value is below the THRESHOLD value, the frame of video data is supplied to the video encoder 356, as illustrated by step 516 in accordance with the defined format dictated by the encoder specification. In this manner, only compression of video data which will not cause the processor resource usage to exceed the THRESHOLD value or, alternatively, which will cause the processor resource usage to exceed the THRESHOLD value by a tolerable limit will occur. Control program 358 continues in this manner until the video conferencing application 357 terminates, as illustrated by steps 518 and 520. In this manner, the amount of processor utilization, and the number of presented frames per second will increase as long as the THRESHOLD value is not exceeded. Correspondingly, the number of presented frames per second will decrease as long as the THRESHOLD value is exceeded. As suggested above, some leeway may be provided to allow a frame to be encoded if the processor utilization will be exceeded by minimal amount, e.g. less that 10 processor cycles. In an alternative embodiment, steps 512 and 514 may be replaced by alternative steps in which the value of either IFRAMEAVG or DFRAMEAVE, depending on the type of frame specified in the interrupt, is subtracted from the THRESHOLD value and the PROCESSORUSE value compared to the remaining THRESHOLD value. If the PROCESSORUSE value is less than or equal to the remaining THRESHOLD value, the frame of video data is supplied to the video encoder 356 in accordance with the defined format dictated by the encoder specification. If the PROCESSORUSE value is greater than the remaining THRESHOLD value, the frame of video data is discarded and no new video data is supplied to the video encoder 356. For purposes of the invention the PROCESSORUSE value is considered to exceed the remaining THRESHOLD value by a single processor cycle or, alternatively, by a certain amount, which can be anywhere from between 1 to a specified number of processor cycles, e.g. 10, depending on the level of exactness desired.

Although the invention has been described with reference to the H.263 video codec, it will be obvious to those skilled in the arts that other video encoding standards, such as H.261 may be equivalently substituted and still benefit from the invention described herein. In addition, the present invention may be used with a general purpose processor, such as a microprocessor based CPU in a personal computer, PDA or other device or with a system having a special purpose video or graphics processor which is dedicated to processing video and/or graphic data.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein have been described using products from Lotus Development Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Although an all software embodiment of the invention was described, it will be obvious to those skilled in the art that the invention may be equally suited for use with video system the use firmware or hardware components to accelerate processing of video signals. Such modifications to the inventive concept are intended to be covered by the appended claims.

What is claimed is:

1. In a computer system having a processor, a device for generating a stream of video data and a mechanism for compression of captured video data, a method for controlling processor utilization during a video conferencing session comprising:

(A) receiving a request for a captured portion of the stream of video data;

(B) determining a current rate of processor utilization;

(C) comparing the current rate of processor utilization with a threshold for processor utilization;

(D) preventing a captured portion of the video data from being processed by the compression mechanism, if compression of the captured portion of the video data would cause a future rate of processor utilization to exceed the threshold for processor utilization; and (E) repeating (B) through (D).

2. The method of claim 1 further comprising:

(F) receiving indicia identifying a specified threshold for processor utilization.

3. The method of claim 1 wherein (D) comprises:

(D1) providing a known rate of processor utilization for a known quantity of captured video data.

4. The method of claim 3 wherein (D) further comprises:

(D2) comparing a sum of the known rate of processor utilization and the current rate of processor utilization with the threshold for processor utilization.

5. The method of claim 3 wherein (D) further comprises:

(D2) comparing a difference of the known rate of processor utilization and the threshold for processor utilization with the current rate of processor utilization.

6. The method of claim 3 wherein the known rate of processor utilization represents an average rate of processor utilization for a known quantity of captured video data.

7. The method of claim 1 wherein processor resources are measured in processor cycles.

8. The method of claim 1 further comprising:

(D) repeating (A) through (C).

9. A computer program product for use with a computer system having a processor, a device for generating a stream of captured video data and a mechanism for compression of the captured video data, the computer program product comprising a computer useable medium having embodied therein program code comprising:

A) program code for receiving a request for a captured portion of the stream of video data;

B) program code for determining a current rate of processor utilization;

C) program code for comparing the current rate of processor utilization with the threshold for processor utilization; and D) program code for preventing a portion of the captured video data from being processed by the compression, if compression of the portion of the captured video data would cause the rate of processor utilization to exceed the threshold for processor utilization.

10. The computer program product of claim 9 further comprising:

(E) program code for receiving indicia identifying a specified threshold for processor utilization.

11. The computer program product of claim 9 wherein (D) comprises:
(D1) program code for providing a known rate of processor utilization for a known quantity of captured video data.

12. The computer program product of claim 11 wherein (D) further comprises:
(D2) program code for comparing a sum of the known rate of processor utilization and the current rate of processor utilization with the threshold for processor utilization.

13. The computer program product of claim 11 wherein (D) further comprises:
(D2) program code for comparing a difference of the known rate of processor utilization and the threshold for processor utilization with the current rate of processor utilization.

14. The computer program product of claim 11 wherein the known rate of processor utilization represents an average rate of processor utilization for a known quantity of captured video data.

15. The computer program product of claim 9 wherein processor resources are measured in processor cycles.

16. A computer data signal embodied in a carrier wave for use with a computer system having a processor, a device for generating a stream of captured video data and a mechanism for compression of the captured video data, the computer data signal comprising:
A) program code for receiving a request for a captured portion of the stream of video data;
B) program code for determining a current rate of processor utilization;
C) program code for comparing the current rate of processor utilization with the threshold for processor utilization; and
D) program code for preventing a portion of the captured video data from being processed by the compression, if compression of the portion of the captured video data would cause the rate of processor utilization to exceed the threshold for processor utilization.

17. The computer data signal of claim 16 further comprising:
(E) program code for receiving indicia identifying a specified threshold for processor utilization.

18. The computer data signal of claim 16 wherein (D) comprises:
(D1) program code for providing a known rate of processor utilization for a known quantity of captured video data.

19. The computer data signal of claim 18 wherein (D) further comprises:
(D2) program code for comparing a sum of the known rate of processor utilization and the current rate of processor utilization with the threshold for processor utilization.

20. The computer program product of claim 18 wherein (D) further comprises:
(D2) program code for comparing a difference of the known rate of processor utilization and the threshold for processor utilization with the current rate of processor utilization.

21. The computer data signal of claim 18 wherein the known rate of processor utilization represents an average rate of processor utilization for a known quantity of captured video data.

22. The computer data signal of claim 16 wherein processor resources are measured in processor cycles.

23. An apparatus for use with a computer system having a processor, a device for generating a stream of video data and a mechanism for compression of captured video data, the apparatus for controlling processor utilization during video conferencing comprising:
(A) program logic configured to receive a request for a captured portion of the stream of video data;
(B) program logic configured to determine a current rate of processor utilization;
(C) program logic configured to compare the current rate of processor utilization with the threshold for processor utilization;
(D) program logic configured to prevent a portion of the captured video data from being processed by the compression mechanism, if compression of the portion of the captured video data would cause the rate of processor utilization to exceed the threshold for processor utilization.

24. The apparatus of claim 23 further comprising:
(E) program logic for receiving indicia identifying a specified threshold for processor utilization.

25. The apparatus of claim 24 wherein (D) comprises:
(D1) program logic for providing a known rate of processor utilization for a known quantity of captured video data.

26. The apparatus of claim 25 wherein (D) further comprises:
D2) program logic for comparing a sum of the known rate of processor utilization and the current rate of processor utilization with the threshold for processor utilization.

27. The apparatus of claim 25 wherein (D) further comprises:
(D2) program logic for comparing a difference of the known rate of processor utilization and the threshold for processor utilization with the current rate of processor utilization.

28. The apparatus of claim 25, wherein the known rate of processor utilization represents an average rate of processor utilization for a known quantity of captured video data.

29. The apparatus of claim 23 wherein processor resources are measured in processor cycles.

30. In a computer system having a processor, a device for generating a stream of video data and a mechanism for compression of captured video data, a method for controlling processor utilization during a video conferencing session comprising:
(A) determining a current rate of processor utilization;
(B) comparing the current rate of processor utilization with a threshold for processor utilization;
(C) preventing a captured portion of the video data from being processed by the compression mechanism, if compression of the captured portion of the video data would cause a future rate of processor utilization to exceed the threshold for processor utilization.

31. The method of claim 30 wherein (C) further comprises:
(C1) comparing a sum of a known rate of processor utilization and the current rate of processor utilization with the threshold for processor utilization.

32. The method of claim 31 wherein the known rate of processor utilization represents an average rate of processor utilization for a known quantity of captured video data.

33. The method of claim 30 wherein (C) further comprises:
(C1) comparing a difference of a known rate of processor utilization and the threshold for processor utilization with the current rate of processor utilization.

34. The method of claim 33 wherein the known rate of processor utilization represents an average rate of processor utilization for a known quantity of captured video data.

35. In a computer system having a processor, a device for generating a stream of video data and a mechanism for compression of captured video data, a method for controlling processor utilization during a video conferencing session comprising:

(A) comparing a current rate of processor utilization with a predefined threshold for processor utilization;

(B) preventing a captured portion of the video data from being processed by the compression mechanism, if compression of the captured portion of the video data would cause a future rate of processor utilization to exceed the predefined threshold for processor utilization.

36. The method of claim 35 wherein (B) further comprises:

(B1) comparing a sum of a known rate of processor utilization and the current rate of processor utilization with the predefined threshold for processor utilization.

37. The method of claim 35 wherein (B) further comprises:

(B1) comparing a difference of a known rate of processor utilization and the predefined threshold for processor utilization with the current rate of processor utilization.

* * * * *